United States Patent
Kobayashi et al.

[11] Patent Number: 5,118,981
[45] Date of Patent: Jun. 2, 1992

[54] PIEZOELECTRIC SENSOR FOR MONITORING KINETIC MOMENTUM

[75] Inventors: Hiroshi Kobayashi, Kanagawa; Masaru Goto, Saitama, both of Japan

[73] Assignees: Nissan Motor Company, Limited, Yokohama; Kanto Sieki Co., Ltd., Omiya, both of Japan

[21] Appl. No.: 404,281

[22] Filed: Sep. 8, 1989

[30] Foreign Application Priority Data

Sep. 9, 1988 [JP] Japan .................. 63-224807

[51] Int. Cl.⁵ .................................. H01L 41/08
[52] U.S. Cl. .................. 310/329; 310/324; 310/327; 310/345
[58] Field of Search ........... 310/329, 345, 324, 327; 73/35, 651, 654

[56] References Cited

U.S. PATENT DOCUMENTS

| | | | |
|---|---|---|---|
| 3,137,836 | 6/1964 | Glover | 310/345 X |
| 3,241,373 | 3/1966 | Ricketts et al. | 310/329 X |
| 3,252,016 | 5/1966 | Hayes, Jr. et al. | 310/329 |
| 3,311,761 | 3/1967 | Schloss | 310/329 |
| 3,331,970 | 7/1967 | Dundan et al. | 310/324 |
| 3,578,995 | 5/1971 | Massa | 310/324 X |
| 3,708,702 | 1/1973 | Brunnert et al. | 310/345 X |
| 3,879,726 | 4/1975 | Sweany | 310/324 X |
| 4,581,506 | 4/1986 | Bai et al. | 310/329 X |
| 4,658,175 | 4/1987 | Albert | 310/323 |
| 4,696,489 | 9/1987 | Fujishiro et al. | 280/707 |
| 4,712,098 | 12/1987 | Laing | 310/329 X |

FOREIGN PATENT DOCUMENTS

| | | | |
|---|---|---|---|
| 909257 | 7/1949 | Fed. Rep. of Germany | 310/329 |
| 3709720 | 10/1987 | Fed. Rep. of Germany | . |
| 61-96340 | 6/1986 | Japan | 310/329 |
| 2180346 | 3/1987 | United Kingdom | . |

Primary Examiner—Mark O. Budd
Attorney, Agent, or Firm—Foley & Lardner

[57] ABSTRACT

A piezoelectric sensor for monitoring the kinetic momentum of a movable member has a piezoelectric sensor assembly composed of a flexible plate member having at least one plane surface and a piezoelectric element fitted onto the plane surface of the flexible plate. A mass weight member rigidly attached to the piezoelectric sensor assembly for movement therewith, the mass weight member being so configurated and arranged as to exert oscillation energy thereof essentially around the center axis of the piezoelectric sensor assembly. Exertion of vibration or oscillation energy of the mass weight member essentially around the center axis of the sensor assembly may cause greater deformation in the sensor assembly for higher sensor output.

28 Claims, 4 Drawing Sheets

PIEZOELECTRIC SENSOR FOR MONITORING KINETIC MOMENTUM

BACKGROUND OF THE INVENTION

1. Field of the Invention

The present invention relates generally to a piezoelectric sensor for monitoring kinetic momentum of movable mechanical constructions. More specifically, the invention relates to a piezoelectrio-type momentum sensor suitable for use as an accelerometer, such as employed for an automotive control system. Particularly, the invention relates to a piezoelectric sensor specifically adapted for monitoring relative displacement between a vehicle body and a wheel axle in an automotive suspension system.

2. Description of the Background Art

U.S. Pat. No. 4,696,489, issued on Sep. 27, 1987, to Takeshi FUJISHIRO et al, and assigned to the common assignee of the present invention discloses an automotive suspension control system in which an accelerometer is incorporated for monitoring vertical acceleration of the vehicle body for utilizing the monitored vertical acceleration of the vehicle body as one of control parameter in the damping characteristics of the vehicular suspension system. In the construction shown in the aforementioned U.S. Patent, the accelerometer employs an inertia member causing deformation of a resiliently deformable member and a strain gauge for detecting deformation magnitude and speed and thereby detecting the vertical acceleration of the vibrating vehicle body. Such a type of accelerometer may be replaced with a piezoelectric-type accelerometer for performing the same or a similar acceleration monitoring operation.

One typical piezoelectric-type accelerometer which employ piezoelectric element as a sensor element, has been disclosed in the Japanese Patent First (unexamined) Publication (Tokkai) Showa 59-23223, for example. Such a conventional piezoelectric accelerometer employs a piezoelectric sensor element supported in a housing in cantilever fashion. In this construction, the piezoelectric sensor element may vibrate about the supported end when vibration energy is exerted. This concentration of distortion stress around the supported end causes uneven exhaustion. Therefore, such concentrated stress may make it difficult to stably maintain reasonable performance and will shorten the life of the accelerometer.

In addition, when the supporting structure, supporting the piezoelectric sensor element is of asymmetric construction, the sensitivity of the sensor element tends to fluctuate, depending upon the exerting direction of the vibration energy. In order to avoid this, the conventional cantilever type piezoelectric sensor element supporting structure is precisely symmetric in construction. This requires high accuracy machining, such as by means of laser machining apparatus. As will be clear, such high accuracy machining requires a substantial cost.

Therefore, an improvement has been proposed in co-pending U.S. patent application Ser. No. 120,964, filed on Nov. 16, 1987, by Hiroshi KOBAYASHI et al. In the proposed improvement, the piezoelectric kinetic momentum sensor employs a thin oscillable diaphragm member on which a thin plate form piezoelectric sensor element is mounted. The overall circumferential edge of the oscillable diaphragm member is supported on a sensor casing. So as to avoid fluctuation of sensitivity, depending upon the exerting direction of a kinetic energy, the diaphragm member and the piezoelectric sensor element are formed in a coaxial thin disc shaped configuration, in the preferred construction. In the further preferred construction, the sensor casing is composed of separable two bottomed cylindrical components, each of which has a circumferential cylindrical wall section having free edge mating with the other. The circumferential edge of the diaphragm member is sandwiched between the mating free edges of the cylindrical components to define a sealingly enclosed internal space within the sensor casing.

Furthermore, the above-identified co-pending U.S. Patent Application proposes, in FIG. 5 of the application, use of mass weight member fitted to the piezoelectric element for adjustment of the resonance frequency and providing maximized sensitivity of kinetic energy is employed.

In the last mentioned piezoelectric kinetic momentum sensor, it is required to minimize the weight of the mass weight member with maximized sensitivity and accuracy in monitoring the kinetic energy.

SUMMARY OF THE INVENTION

Therefore, it is an object of the invention to provide a piezoelectric kinetic momentum sensor which can achieve the task or requirement set forth above.

In order to accomplish aforementioned and other objects, a piezoelectric sensor for monitoring the kinetic momentum of a movable member, according to the present invention, has a piezoelectric sensor assembly composed of a flexible plate member having at least one plane surface and a piezoelectric element fitted onto the plane surface of the flexible plate. A mass weight member rigidly attached to the piezoelectric sensor assembly for movement therewith, the mass weight member being so configurated and arranged as to exert oscillation energy thereof essentially around the center axis of the piezoelectric sensor assembly. Exertion of vibration or oscillation energy of the mass weight member essentially around the center axis of the sensor assembly may cause greater deformation in the sensor assembly for higher sensor output.

According to one aspect of the invention, a piezoelectric sensor for monitoring the kinetic momentum of a movable member, comprises:

a sensor casing defining a sealed internal space therein;

a piezoelectric sensor assembly composed of a flexible plate member having at least one plane surface and a piezoelectric element fitted onto the plane surface of the flexible plate;

a mass weight member rigidly attached to the piezoelectric sensor assembly for movement therewith, the mass weight member being so configured and arranged as to exert oscillation energy thereof essentially around the center axis of the piezoelectric sensor assembly; and a sensor support member secured onto the inner periphery of a circumferential wall of the sensor casing and engaging the entire circumferential edge of the piezoelectric sensor assembly so as to oscillably support the latter within the enclosed internal space of the sensor casing.

The mass weight member may have different cross section at a different portion and an axial end portion thereof to be secured onto the piezoelectric sensor assembly defines the minimal contact area around the center axis. The mass weight member may have a first end surface oriented away from the piezoelectric sensor assembly and a second end surface rigidly secured onto the piezoelectric sensor assembly, the second end surface having smaller area than the first end surface. In the alternative, the mass weight member has a first section oriented away from the piezoelectric sensor assembly and into disc shaped configuration, and a second section formed into a cylindrical configuration having end rigidly secured onto the piezoelectric sensor assembly, the end of the second section having a diameter smaller than that of the first section.

According to another aspect of the invention, a piezoelectric sensor for monitoring the kinetic momentum of a movable member, comprises:

a sensor casing defining a sealed internal space therein;

a piezoelectric sensor assembly composed of a flexible plate member having at least one plane surface and a piezoelectric element fitted onto the plane surface of the flexible plate;

a mass weight member rigidly attached to the piezoelectric sensor assembly for movement therewith, the mass weight member having a first section oriented away from the piezoelectric sensor assembly and a second section adjoined with the first section and rigidly secured to the piezoelectric sensor assembly, the second section having a second surface area on a surface attached to the piezoelectric sensor assembly and smaller than the surface area of the first section; and a sensor support member secured onto the inner periphery of a circumferential wall of the sensor casing and engaging the entire circumferential edge of the piezoelectric sensor assembly so as to oscillably support the latter within the enclosed internal space of the sensor casing.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
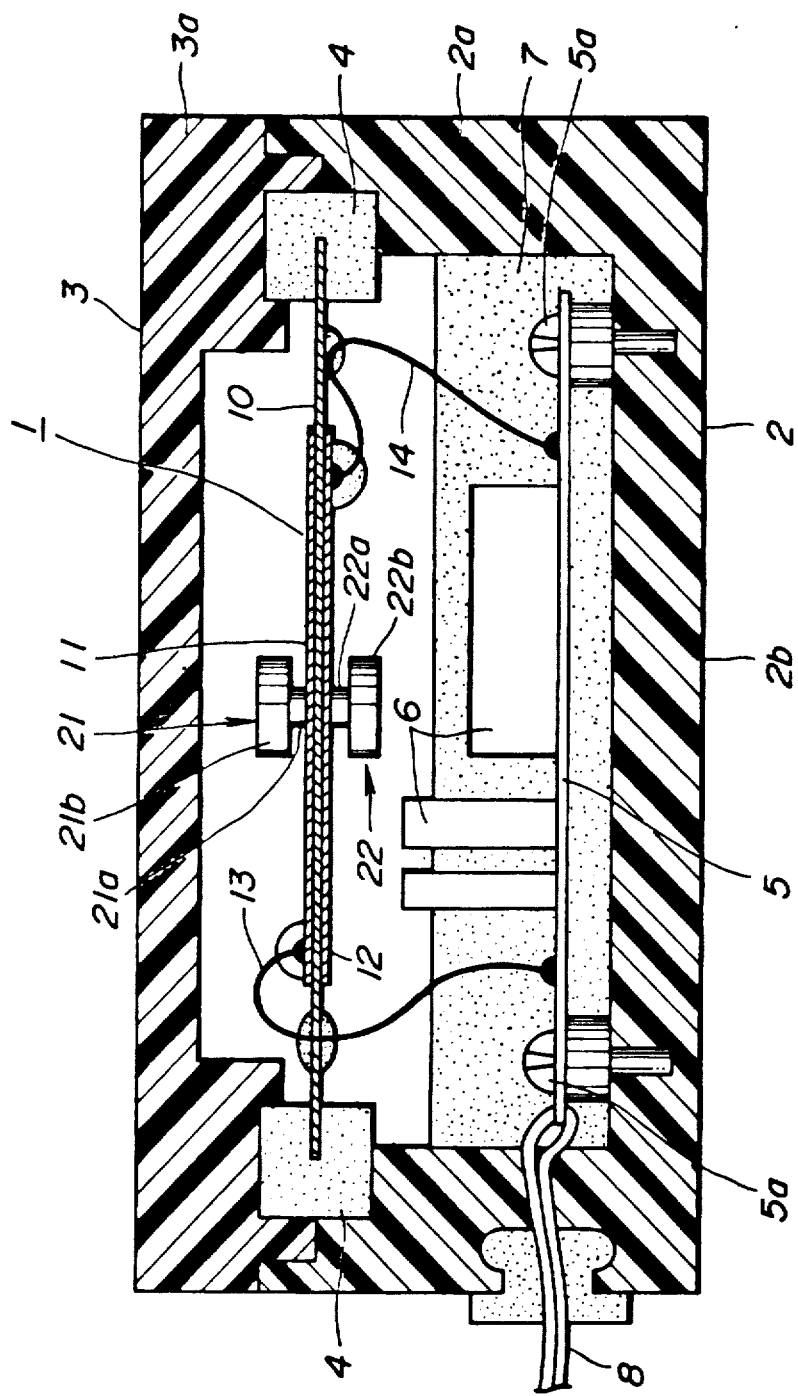
FIG. 1 is a section of the preferred embodiment of a piezoelectric kinetic momentum sensor assembly according to the present invention.
Figure 2:
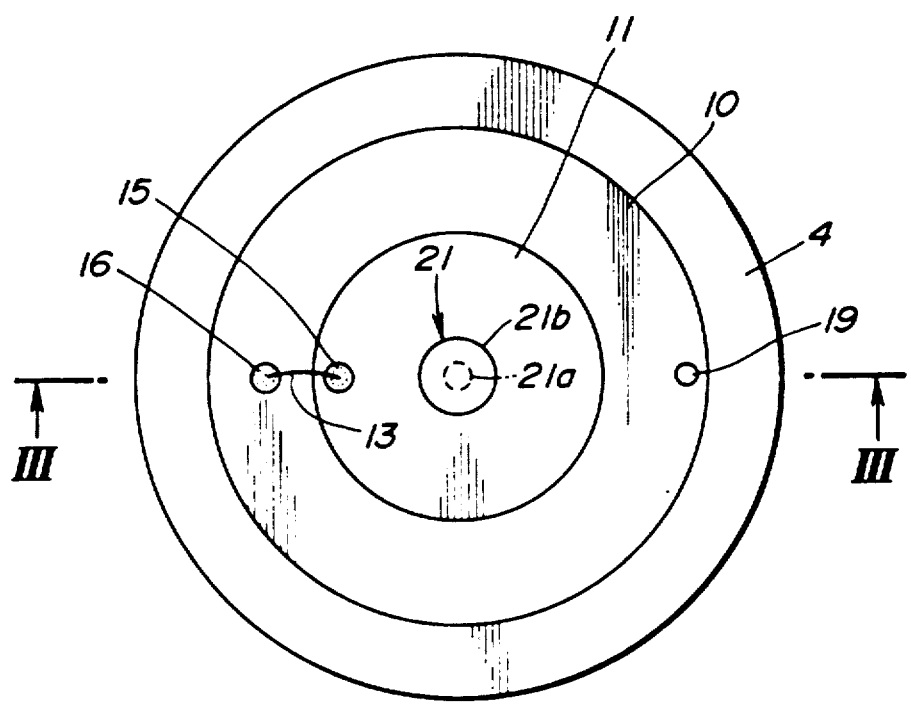
FIG. 2 is a plan view of a piezoelectric sensor to be employed in the piezoelectric kinetic momentum sensor assembly of FIG. 1.
Figure 3:
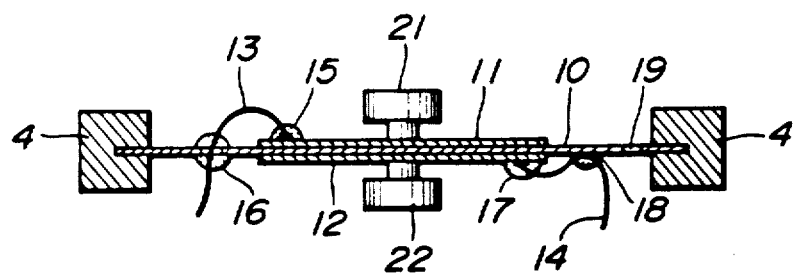
FIG. 3 is a section of the piezoelectric sensor taken along line III—III of FIG. 2.

Referring now to the drawings, particularly to FIGS. 1 through 3, the preferred embodiment of a piezoelectric kinetic momentum sensor assembly includes a oscillable piezoelectric sensor 1. The detailed construction of the piezoelectric sensor 1 will be discussed later.

The piezoelectric sensor 1 is oscillable disposed within a sensor casing which is composed of a lower casing component 2 and an upper casing component 3. Both of the lower and upper casing components 2 and 3 are made of non-conductive synthetic resin, such as polyacetals or the like. The lower and upper casing components 2 and 3 respective have cylindrical circumferential wall sections 2a and 3a mating at free end edges thereof. An annular and cross-sectionally square clearance is defined between the mating edges of the lower and upper casing components 2 and 3 to receive therein an annular sensor support member 4. The sensor support member 4 is made of an elastic material, such as polyurethane resin. The sensor support member 4 engages with the circumferential edge of the oscillable piezoelectric sensor 1 for oscillably supporting the latter within an internal space of the sensor casing.

The lower and upper casing components 2 and 3 are sealingly and rigidly bonded or welded by way of vibration welding and so forth. The enclosed internal space of the sensor casing can be completely sealed.

A circuit board 5 on which various electric and/or electronic circuit components 6, such as filter, amplifier and so forth, are mounted. The circuit board 5 lies substantially in parallel to the bottom 2b of the lower casing component 2 and rigidly secured thereonto by means of fastening screws 5a. The circuit board 5 and the circuit components 6 are buried in a potting resin layer 7 which will be filled after rigidly fastening the circuit board 5 onto the bottom 2b of the lower casing component 2.

The circuit board 5 is connected to an external circuit via a lead wire 8 which extends through a grommet 8a sealingly engaged on the outer periphery of the circumferential wall section 2a of the lower casing component 2.

The piezoelectric sensor 1 comprises a thin disc-shaped metal plate 10 which has circumferential edge portion rigidly engaged with the sensor support member 4. A pair of piezoelectric elements 11 and 12 are formed in thin disc-shaped configurations each having a diameter smaller than the diameter of the metal plate 10. The piezoelectric elements 11 and 12 are arranged concentrically with the metal plate 10 and bonded or adhered on the both side surfaces of the metal plate 10 by adhesive of epoxy resin and so forth.

As clearly seen from FIGS. 2 and 3, since the piezoelectric elements 11 and 12 are provided with a smaller diameter than that of the metal plate 10, the circumferential edges of the piezoelectric elements 11 and 12 are placed away from the inner circumferential edge of the sensor support member 4. As a consequence, annular portion of the metal plate 10 adjacent the circumferential edge is exposed.

The piezoelectric elements 11 and 12 are connected to the circuit board via lead wires 13 and 14 respectively. As is well known, since the piezoelectric elements 11 and 12 are provided substantially high impedance, the lengths of the lead wires 13 and 14 will effect the sensing of kinetic momentum by creating static electric capacities. This effect of the static electric capacities can be minimized by shortening the lengths of the leads 13 and 14. In the shown embodiment, since the piezoelectric sensor 1 and the circuit board 5 are housed in the single sensor casing with substantially short distance therebetween, shortening of the lead wires 13 and 14 becomes possible.

In the preferred construction, the pair of piezoelectric elements 11 and 12 are provided mutually opposite output characteristics relative to variation of the temperature. Namely, since the piezoelectric elements 11 and 12 have temperature dependent variable output characteristics, the influence of variation of the output characteristics of the piezoelectric elements can be for by providing the opposite temperature dependent variation characteristics.

On the other hand, in order to avoid any influence of thermal expansion of the metal plate 10 and the piezoelectric elements 11 and 12, material of respective of the metal plate and the piezoelectric element will be selected so that the thermal-expansion rate would be as close as possible. In practice, when P.Z.T. is selected as a material for the piezoelectric elements 11 and 12, the material of the metal plate 10 may be selected among Ni-Fe alloys which has close thermal expansion rate to that of the piezoelectric elements 11 and 12. With this construction, influence of the difference of the thermal expansion rates of the metal plate 10 and the piezoelectric elements 11 and 12 can be minimized.

On the other hand, the lead wires 13 and 14 are made of tin plated mild copper and formed by aggregating a plurality of thin copper lines into a wire. The lead wires 13 and 14 are covered by a polyulethane cover layer. The lead wires 13 and 14 are fixed to respectively associated one of the piezoelectric elements 11 and 12 by soldering. The joining portions between the lead wires 13 and 14 and the piezoelectric elements 11 and 12 are coated by an elastic shock absorbing material 15 and 17, such as polyulethane.

Furthermore, lead wires 13 and 14 are further secured to the annular bare portion of the metal plate 10 by elastic shock absorbing material 16 and 18. Similarly to the shock absorbing materials 15 and 17, the elastic shock absorbing materials 16 and 18 are made of polyulethane, for example. Between the mutually associated elastic shock absorbing materials 15, 16 and 17, 18, extra length of the lead wires 13 and 14 provide sag.

The sensor support member 4 is formed of an elastic synthetic resin, such as polyulethane resin. This sensor support member 4 is formed as a pre-assembly with the piezoelectric sensor 1. Namely, the piezoelectric sensor 1 is set in a molding for forming the sensor support member 4. After setting the piezoelectric sensor 1 in the molding, the molten material of the sensor support member is filled into the molding. The pre-assembly of the sensor support member 4 and the piezoelectric sensor 1 is removed from the molding after solidifying of the resin of the sensor support material.

The pre-assembly of the sensor support member 4 and the piezoelectric sensor 1 is assembled with the lower and upper casing components 2 and 3 of the sensor casing by placing the sensor support member 4 within the annular space defined between the lower and upper casing components. After assembling, the sensor support member 4 may elastically support the piezoelectric sensor relative to the sensor casing. The sensor an member 4 also serves as sealing means for estabilishing dir and/or liquid tight seal. Therefore, vapor in the atmospheric air and so forth will never enter into the internal space of the sensor casing, which vapor or moisture may otherwise cause leakage of the sensor voltage.

Therefore, in the shown construction, the overall circumferential edge of the generally disc-shaped piezoelectric sensor 1 is supported on the inner periphery of the sensor casing. This construction allows the piezoelectric sensor 1 to oscillate in response to the kinetic energy exerted in parallel to the vertical axis of the sensor casing. Namely, the piezoelectric sensor 1 is not responsive to the kinetic energy laterally exerted in a direction substantially perpendicular to the axis of the sensor casing. On the other hand, when the kinetic energy is exerted in an oblique direction relative to the axis of the sensor casing, the piezoelectric sensor 1 is responsive only to the axial component of the kinetic energy.

When axial kinetic energy is exerted on the piezoelectric sensor 1, the sensor is caused by deformation to create an output voltages of the piezoelectric elements 11 and 12, which are variable, depending upon the magnitude of the kinetic energy exerted. The outpon voltages of the piezoelectric elements 11 and 12 are amplified and filtered by the circuit on the circuit board, and, then, output, through the lead wire B as the kinetic momentum indicative sensor signal.

At this time, since the overall circumferential edge of the pre-assembly of the piezoelectric sensor 1 and the sensor support member 4 is sealingly secured onto the inner periphery of the circumferential wall of the sensor casing, the enclosed internal space of the sensor casing is separated into separated two chambers. When both chambers are not communicated with each other, pressure difference may be created by deformation of the piezoelectric sensor 1. This pressure difference serves as resistance against deformation of the piezoelectric sensor 1 to lower the voltage to be created. This clearly degrades precision of measurement of the kinetic momentum. Furthermore, such separated chamber tends to cause deformation of the piezoelectric sensor 1 when temperature difference between two chambers occurs. Namely, when temperature difference occurs, pressures of the chambers becomes different to cause deformation of the piezoelectric sensor toward the chamber with lower pressure than the other. In order to avoid this problem, one or more small opening 19 are formed through the annular bare section of the metal plate 10. These through openings 19 establish communication of both chambers and thus, equalize the pressure of the chambers.

As set forth, since the sensor casing is sealingly enclosed in liquid-tight and air-tight fashion, entry of dust, moisture, corrosive gas and so forth can be completely prevented. Therefore, as set forth above, leakage of the output voltage due to presence of moisture can be perfectly prevented. On the other hand, since the piezoelectric sensor 1 of the shown embodiment of the kinetic momentum sensor is provided precise directionality in kinetic energy or momentum sensibility, the kinetic energy or momentum in the direction different from the axial direction will not serve as a noise creating factor. This assures high precision on measurement of the kinetic momentum in the predetermined direction.

In addition, since no corrosive gas may enter into the internal space of the sensor casing, corrosion of the piezoelectric elements and/or the metal plate can be successfully prevented. Also, since the bending stress to be exerted on the metal plate while the piezoelectric sensor 1 may be distributed over the overall circumferential edge at substantially even rate to avoid concentration of the stress. Therefore, the life of the piezoelectric sensor can be remarkably expanded and thus the line of the kinetic momentum sensor can be prolongated to be long enough to employ in the automotive suspension control system, for example.

Figure 4:
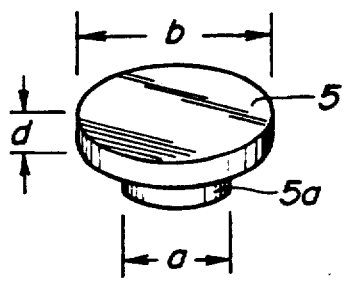
FIG. 4 is a perspective view of a mass weight member employed in the preferred embodiment of the piezoelectric kinetic momentum sensor according to the invention.

In addition to the construction set forth above, the preferred embodiment of the piezoelectric sensor 1 has a pair of mass weight memebers 21 and 22 attached on both sides. As shown, the mass weight members 21 and 22 are essentially aligned on the center axis of the piezoelectric sensor. Each of the mass weight members 21 and 22 are formed of Ni-Fe alloy. As can be clearly seen from FIG. 4, the mass weight member 21 has a head portion 21b of essentially disc shaped configuration and a stem portion 21a having smaller diameter a than the diameter b of the head postion. The mass weight member 21 is attached to the piezoelectric element 11 by bonding or adhesive. The mass weight member 22 has the identical construction to the mass weight member 20 and bonded onto the piezoelectric member 12. Such construction of the mass weight members 21 and 22 is effective for providing high level sensor output without causing substantial increase of the mass weight of the whole body of the sensor.

Figure 5:
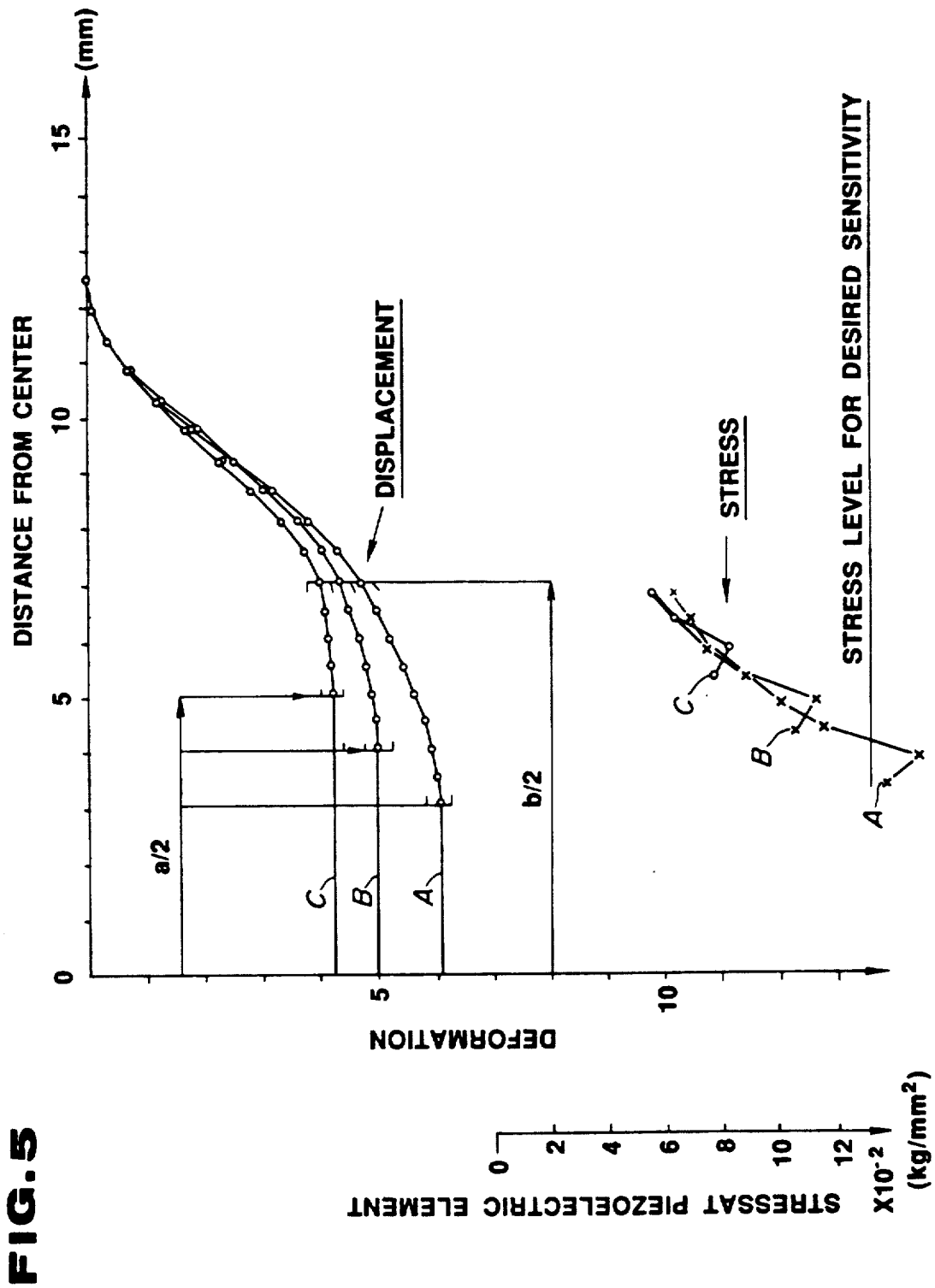
FIG. 5 is a graph showing variations of stress in a piezoelectric element and deformation magnitude of a sensor assembly in relation to a surface area of the mass weight member to mate with the sensor assembly.
Figure 6:
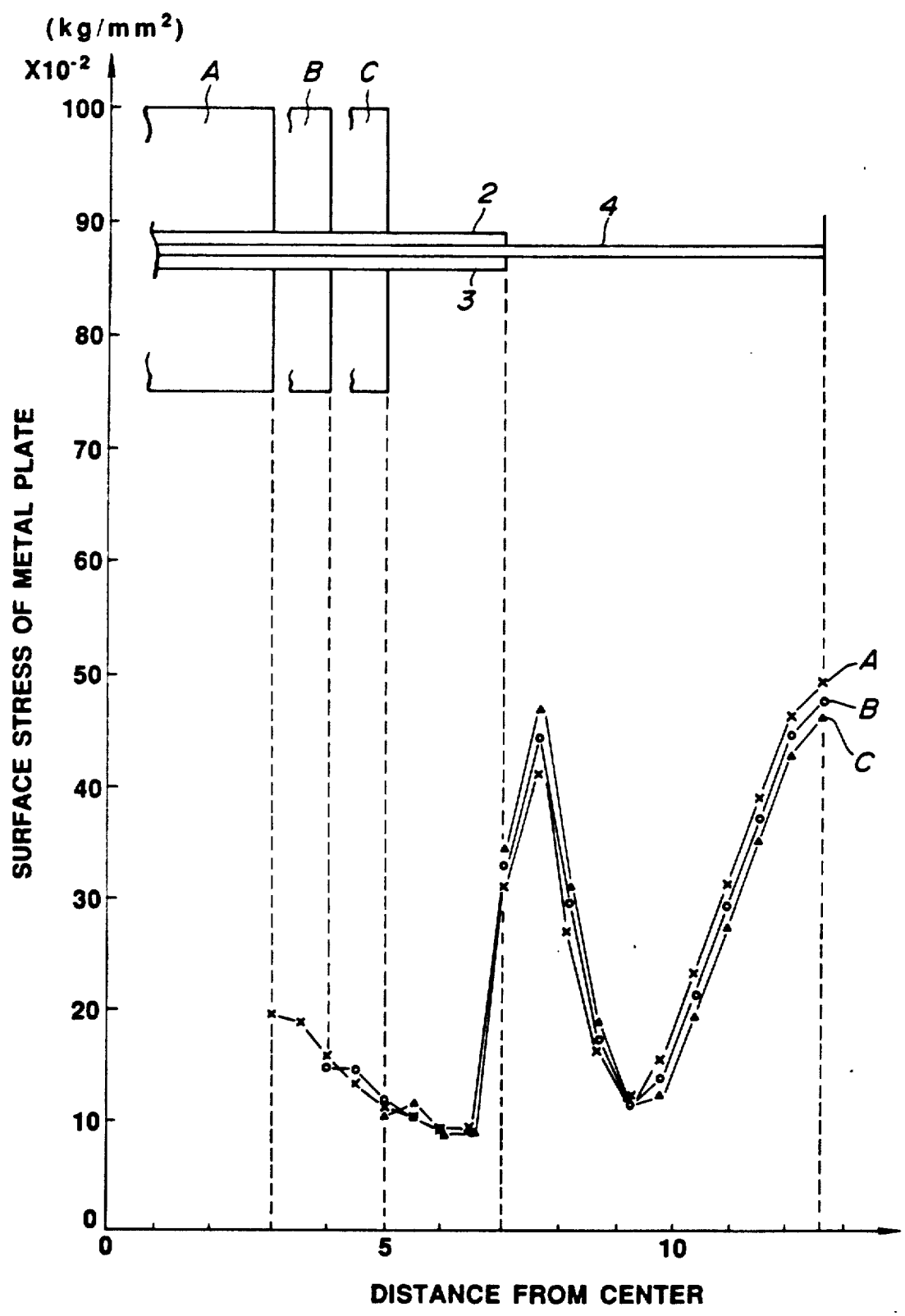
FIG. 6 is a graph showing variations of maximum stress at a metal plate in relation to the surface area of the mass weight member to mate with the sensor assembly.

FIGS. 5 and 6 show results of experiments taken place for demonstrating the advantages of the shown embodiment of the sensor. FIG. 5 shows results of experiment, in which the diameters of the metal plate 10 and the piezoelectric elements 11 and 12 are set constant. For this assembly of the piezoelectric sensor 1, the mass weight members 21 and 22, total weight thereof being 6 g and having the diameter b of 14 mm at each of the head portions 21a and 22a were attached by bonding. Then, the thickness d of the head portion and the diameter a of the stem portion were varied as listed below:

$$A: a = 6 \text{ mm}\phi, d = 4.6 \text{ mm}$$
$$B: a = 8 \text{ mm}\phi, d = 4.4 \text{ mm}$$
$$C: a = 10 \text{ mm}\phi, d = 4.2 \text{ mm}$$

For these three samples, the deformation magnitude of the piezoelectric sensor 1 and stress on the piezoelectric elements 11 and 12 was measured. From the result of measurement, it can be clearly appreciated that smaller diameter a at the stem portion will generate greater stress and thus cause greater deformation. Therefore, it is appreciated that by providing smaller diameter at the stem portion, higher sensitivity of the sensor can be obtained.

On the other hand, FIG. 6 shows results of experiments performed for the samples A, B and C. For the piezoelectric sensors ±3 G of acceleration was exerted. Then, the maximum stress acting on the piezoelectric element. As can be seen from FIG. 6, it may be found that the maximum stress to be exerted on the piezoelectric element is substantially unchanged irrespective of the diameter a of the stem portion. From this, it was confirmed variation of the step portion of the mass weight member will not affect to the sensor output and durability.

Therefore, taking the fact set forth above into account, a lighter weight of mass weight can be used in measurement of the acceleration energy by reducing the diameter of the stem portion. Lighter weight of mass weight member can provide expanded duration and higher mechanical strength. For instance, in case that the diameter of the head portion is 14 mm$\phi$, 6 mm$\phi$ of stem portion is preferred.

As set forth, the invention as set forth above, the invention achieves high sensitivity and high accuracy with minimum increase of the mass weight.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A piezoelectric sensor for monitoring the kinetic momentum of a movable member, comprising:
   a sensor casing defining a sealed internal space therein;
   a piezoelectric sensor assembly composed of a flexible plate member having at least one plane surface and a piezoelectric element fitted onto said plane surface of said flexible plate;
   a mass weight member rigidly attached to said piezoelectric element for movement with said piezoelectric sensor assembly, said mass weight member being configured and arranged so as to exert oscillation energy thereof essentially around the center axis of said piezoelectric sensor assembly; and
   a sensor support member secured to the inner periphery of a circumferential wall of said sensor casing and engaging the entire circumferential edge of said piezoelectric sensor assembly so as to support in vibration the sensor assembly within said enclosed internal space of said sensor casing.

2. A piezoelectric sensor as set forth in claim 1, wherein said mass weight member has different cross sections at different portions, with its axial end portion thereof secured to said piezoelectric sensor assembly, to define a minimal contact area around said center axis.

3. A piezoelectric sensor as set forth in claim 1, wherein said mass weight member has a first end surface oriented away from said piezoelectric sensor assembly and a second end surface rigidly secured to said piezoelectric sensor assembly, said second end surface having a smaller area than said first end surface.

4. A piezoelectric sensor as set forth in claim 1, wherein said mass weight member has a first section positioned from said piezoelectric sensor assembly, and having a disc shaped configuration, and a second section formed in a cylindrical configuration and having end rigidly secured to said piezoelectric sensor assembly, said end of said second section having a diameter smaller than that of said first section.

5. A piezoelectric sensor for monitoring the kinetic momentum of a movable member, comprising:
   a sensor casing defining a sealed opening therein;
   a piezoelectric sensor assembly composed of a flexible plate member having at least one plane surface and a piezoelectric element fitted onto said plane surface of said flexible plate;
   a mass weight member rigidly attached to said piezoelectric element for movement with said piezoelectric sensor assembly, said mass weight member having a first section located away from said piezoelectric sensor assembly and a second section integral with said first section and rigidly secured to said piezoelectric sensor assembly via said piezoelectric element, said second section having a surface area on the surface attached to said piezoelectric element assembly which is smaller than the surface area of said first section; and a sensor support member secured to the inner periphery of a circumferential wall of said sensor casing and engaging the entire circumferential edge of said piezoelectric sensor assembly so as to support in vibration the sensor assembly within said enclosed internal space of said sensor casing.

6. A piezoelectric sensor as set forth in claim 5, wherein said mass weight member is essentially positioned at the center of said piezoelectric sensor assembly.

7. A piezoelectric sensor as set forth in claim 6, wherein said first section is formed in a disc shaped configuration and said second section is formed in a cylindrical configuration having a diameter smaller than said first section.

8. A piezoelectric sensor as set forth in claim 6, wherein said sensor support member is made of an elastic material so as to increase the active area of the piezoelectric sensor assembly, thereby increasing its sensitivity and compliance.

9. A piezoelectric sensor as set forth in claim 1, wherein wires are attached to said piezoelectric element for externally connecting said piezoelectric sensor, said wires being mounted on said piezoelectric sensor assembly with sufficient length so as to provide additional stress to the piezoelectric assembly in the form of sag.

10. A piezoelectric sensor as set forth in claim 5, wherein wires are attached to said piezoelectric element for externally connecting said piezoelectric sensor, said wires being mounted on said piezoelectric sensor assembly with sufficient length so as to provide additional stress to the piezoelectric assembly in the form of sag.

11. A piezoelectric sensor as set forth in claim 5, wherein the surface area of said second section of said mass weight member is further reduced for applying a greater degree of stress to said piezoelectric sensor assembly while moving therewith.

12. A piezoelectric sensor as set forth in claim 5, wherein the surface area of said second section of said mass weight member is enlarged for applying a lower degree of stress to said piezoelectric sensor assembly while moving therewith.

13. A piezoelectric sensor as set forth in claim 1, wherein said mass weight member is made from an Ni-Fe alloy.

14. A piezoelectric sensor as set forth in claim 5, wherein said mass weight member is made from an Ni-fe alloy.

15. A piezoelectric sensor as set forth in claim 1, wherein said sealed internal space additionally contains a circuit board, said circuit board being fixedly connected to said sensor casing.

16. A piezoelectric sensor as set forth in claim 15, wherein said circuit board is embedded in a plastic composition.

17. A piezoelectric sensor as set forth in claim 5, wherein said sealed internal space additionally contains a circuit board, said circuit board being fixedly connected to said sensor casing.

18. A piezoelectric sensor as set forth in claim 17, wherein said circuit board is embedded in a plastic composition.

19. A piezoelectric sensor as set forth in claim 1, wherein the thermal expansion coefficient of said flexible plate member is substantially that of said piezoelectric element.

20. A piezoelectric sensor as set forth in claim 5, wherein a thermal expansion coefficient of said flexible plate member is substantially that of said piezoelectric element.

21. A piezoelectric sensor for monitoring the kinetic momentum of a movable member, comprising:

a sensor casing defining a sealed opening therein;

a piezoelectric sensor assembly composed of a flexible plate member having at least a plane surface on each side thereof and a piezoelectric element fitted onto each of said plane surfaces of said flexible plate;

two mass weight members rigidly attached, respectively, to each of said piezoelectric elements for movement with said piezoelectric sensor assembly, said mass weight members each having a first section positioned away from said piezoelectric sensor assembly and a second section integral with said first section and rigidly secured to said piezoelectric sensor assembly via respective piezoelectric elements, each said second sections having a second surface area on a surface attached to said piezoelectric element assembly which is smaller than the surface area of said first sections; and a sensor support member secured to the inner periphery of a circumferential wall of said sensor casing and engaging the entire circumferential edge of said piezoelectric sensor assembly so as to support in vibration the sensor assembly within said enclosed internal space of said sensor casing.

22. A piezoelectric sensor as set forth in claim 19, wherein wires are attached to each of said piezoelectric elements for externally connecting said piezoelectric sensor, said wires being mounted on opposing sides of said piezoelectric sensor assembly with sufficient length and symmetry so as to provide additional stress to each piezoelectric assembly in the form of sag.

23. A piezoelectric sensor as set forth in claim 19, wherein the surface area of said second section of said mass weight members is further reduced for applying a greater degree of stress to said piezoelectric sensor assembly while moving therewith.

24. A piezoelectric sensor as set forth in claim 21, wherein said mass weight members are made from an Ni-Fe alloy.

25. A piezoelectric sensor as set forth in claim 19, wherein said sealed internal space additionally contains a circuit board, said circuit board being fixedly connected to said sensor casing.

26. A piezoelectric sensor as set forth in claim 19, wherein said circuit board is embedded in a plastic composition.

27. A piezoelectric sensor as set forth in claim 19, wherein a thermal expansion coefficient of said flexible plate member is substantially that of said piezoelectric elements.

28. A piezoelectric sensor as set forth in claim 19, wherein said two piezoelectric elements form a temperature compensated sensor assembly.

* * * * *